United States Patent [19]

Hellmann

[11] 4,350,381
[45] Sep. 21, 1982

[54] GRIPPER WITH SERIALLY PIVOTED FINGERS

[75] Inventor: Wolf D. Hellmann, Leichlingen, Fed. Rep. of Germany

[73] Assignee: Colortronic Reinhard & Co. KG, Friedrichsdorf, Fed. Rep. of Germany

[21] Appl. No.: 195,037

[22] Filed: Oct. 8, 1980

[30] Foreign Application Priority Data

Oct. 9, 1979 [DE] Fed. Rep. of Germany ....... 2940916

[51] Int. Cl.³ ................................................. B66C 3/16
[52] U.S. Cl. ....................................... 294/88; 269/266; 269/270; 294/99 R; 294/106
[58] Field of Search ...................... 294/86 R, 88, 99 R, 294/106, 111, 112, 116; 3/1.2, 12, 12.1, 12.6, 12.7; 269/25, 27, 30–34, 266, 268, 270, 287; 414/1, 4, 6, 621, 729, 739, 744 A, 753

[56] References Cited

U.S. PATENT DOCUMENTS

| | | | |
|---|---|---|---|
| 2,497,493 | 2/1950 | Edwards | 3/12.7 X |
| 2,847,678 | 8/1958 | Opuszenski | 3/12.7 |
| 2,875,913 | 3/1959 | Gohrke et al. | 294/88 X |
| 3,090,049 | 5/1963 | Lanteigne | 3/1.2 X |
| 3,804,452 | 4/1974 | David et al. | 294/88 |

FOREIGN PATENT DOCUMENTS

| | | | |
|---|---|---|---|
| 2434030 | 5/1975 | Fed. Rep. of Germany | 294/88 |
| 563353 | 7/1977 | U.S.S.R. | 294/88 |

*Primary Examiner*—Johnny D. Cherry
*Attorney, Agent, or Firm*—Sughrue, Mion, Zinn, Macpeak and Seas

[57] ABSTRACT

A manipulator gripper includes a plurality of serially pivoted cylindrical finger members 3, each having an axially parallel but eccentrically disposed bore hole 14 slidably accommodating a piston 5. Upon the application of fluid pressure each piston acts upon the rear surface 15 of a finger member immediately in front to pivot the latter about a bearing bolt 11. A frictional coating 13 may be provided on the working surfaces of the finger members to implement firm workpiece gripping, and a pneumatic sensor line 12 may be disposed below such coating to detect workpiece engagement. Springs 8 provide a restoring force after fluid pressure is relieved.

14 Claims, 6 Drawing Figures

GRIPPER WITH SERIALLY PIVOTED FINGERS

This invention relates to a gripper for use in a manipulator for removing, transporting and unloading production articles, particularly made of plastic in an injection molding machine, wherein the gripper consists essentially of a shaft and several pivoting finger members attached thereon which are pneumatically movable against the force of a spring in their working positions into contact with the object to be gripped.

Such gripping fingers were produced at one time to replace the natural human hand and to produce a gripping tool for amputees modeled after the human hand. Such an artificial gripping hand, for example, is described in German Pat. No. 821,690, and is useful among other things to an increasing degree as an auxiliary means of replacing the human in various industrial processes where an operation, particularly grasping an object, must be carried out precisely and at a specific time. Such grippers are also described in German Pat. No. 2,426,086 for example. The gripper elements described in the latter patent are finger spaced hollow bodies which, due to their geometric shape, curl in response to the application of air pressure and may thus be positioned to grasp objects, hold and transport them. This construction adapts very satisfactorily to the object to be grasped and holds it secure. Being constructed of an elastomer plastic necessarily sets limits on the application of such gripper elements. The pressure to the pneumatic finger must be applied in relation to the wall thickness, otherwise the life span of the pneumatic finger would be considerably reduced or the finger could be destroyed with too high pressure. Even if an automatic gripper could be produced according to the construction in the prior art, which is designed to simulate the ability of the human hand to adapt to the geometric shape and dimensions of the objects to be grasped, the amount of available holding force, particularly when the fingers are spread far apart, is not satisfactory in many cases for the work required of such automatic fingers.

Thus, a conscious decision was made to return in the present invention to rigid mechanical members and an effort was made to eliminate the disadvantages associated with the mechanical grippers in the prior art, particularly to simplify their complicated construction and to create a gripper of the type mentioned at the outset which is simple in construction and nonetheless can be used to satisfy the most varied application demands such as grasping and holding objects of varying shape. In addition the gripper according to the invention should be able to easily adapt to the most varied demands placed on such automatic fingers and be able to apply the desired pressure, particularly when removing larger form molded parts from injection molding machines.

These objects are solved with a gripper of the type mentioned at the outset with the features and characteristics of claim 1. By giving each individual finger member the same shape with the exception of the base and end members, for example, it is possible to produce a three-, four- or more segmented gripper which is simply produced by adding additional finger members to the chain.

Of course, it is understood that the force applied by the piston to pivot the finger members toward one another is greater, given a constant operating pressure, the greater the cross-section of the piston. Therefore, an attempt is made to set aside as much of the cross sectional area of the finger members while considering the necessary rigidity in forming the bearings for the piston. On the other hand the pressure produced by the piston becomes greater, the greater the distance from the gripping point of the piston to the pivoting axis, i.e. the longer the lever arm under which the piston acts on the rear surface of the finger member lying in front of it.

With these considerations in mind the gripper piston according to the invention is formed so that, for example, an axis-symmetrical bore hole is made in each individual finger member and an asymmetrical guide rod is attached to the piston and is accommodated by an additional bore hole that aligns with the latter. In addition, the operating pressure can be increased by using a tandem cylinder, i.e. a double piston which is connected by means of a pressure bar. A separating wall is provided between the two pistons so that with any given operating pressure the effective force is practically doubled.

The individual finger members of the gripper are constructed preferably similar to the links of a link chain. Each member has a central protrusion on one end and two outside fork-like protrusions on the other. The protrusions have bore holes which each accommodate a bolt around which the pivoting movement of the individual finger members occurs. With one embodiment of the gripper according to the invention the bore hole which accommodates the piston in the finger members can be closed off with an insert that seals off the bore hole on the end facing the back end of the gripping finger shaft, with the exception of the end member which can consist of a material with good sliding characteristics, such as brass. From a production point of view it is advantageous to extend the bore hole holding the piston along the entire length of the finger member, with the exception of the end member, and to broaden the bore hole somewhat in its rear section in order to accommodate the insert. The length of the piston is selected somewhat shorter than the remaining bore hole length after fitting on the hindmost gliding insert. To reduce friction the front end of the piston which contacts the rear face of the gliding insert when pressure is applied can be rounded.

To enable the gripping finger to return simply to its rest position compression springs are provided which hold the gripper straight in its rest position and against whose force the operating piston exerts its fluid force in the individual finger members. Advantageously the compression springs are arranged in pairs. In the rest position of the gripping finger they extend into blind bore holes aligned with one another in the face of the adjacent finger member and provide for the extension of the gripper. Movement from the operating position into the rest position by the spring effect of the compression springs can be assisted by connecting the compressed air chambers in the individual finger members temporarily to an air source with reduced pressure, e.g. an 80% vacuum.

Individual finger members and the gripper shaft can be made of a hardened aluminum alloy and have a round cross-section; however, they can also have any other desired cross-section, for example rectangular or square with rounded edges or another shape adapted to the performance of any other specific task. They are advantageously given a coating of high friction material to increase the friction force on their upper working surfaces. It is advantageous to use a material for this purpose with a high coefficient of friction such as rubber or the like, which is applied as a coating to the individual finger members in sections or over the entire gripping finger. It is also possible to provide a sensor line in the form of a thin tube open at its front end in the area of the working surface of the finger member which produces a slight blockage of pressure when the gripper comes into contact with the object to be grasped. This is then converted by a membrane amplifier valve into an electrical control impulse which initiates a certain movement.

Further details of the invention will proceed from the following description of an embodiment shown in the drawing.

Figure 1:
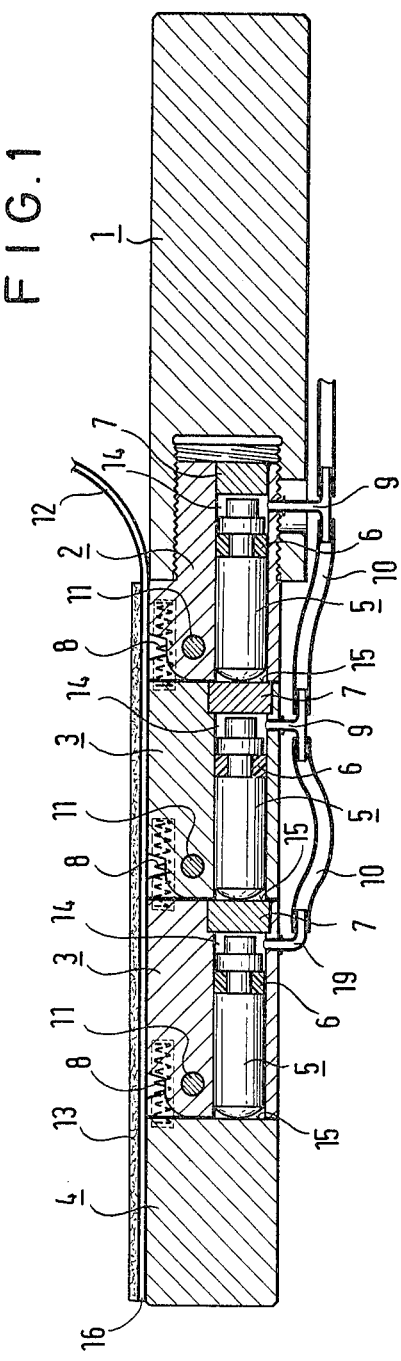
FIG. 1 is a side view in central longitudinal section of a gripper according to the invention in rest position.
Figure 2:
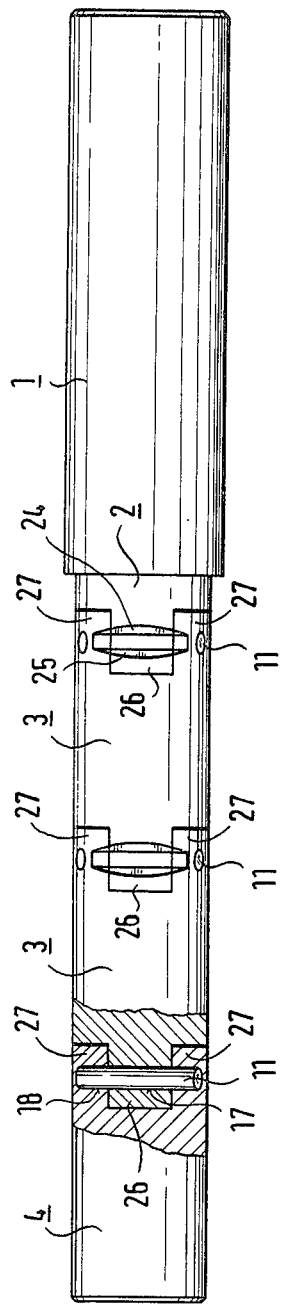
FIG. 2 shows a top view of a gripper according to FIG. 1.

As can be seen from FIG. 1, the gripper consists essentially of a cylindrical shaft 1, a base finger member 2 screwed into shaft 1, and finger member 3 which is pivotally attached by means of a bearing bolt 11 to the base finger member on which a second finger member 3 is hinged. The gripper shown here is capped by the end member 4 which pivots around a bolt 11 in the finger member immediately in front of it similar to the intermediate finger member 3 against the force of a return spring 8.

Figure 3:
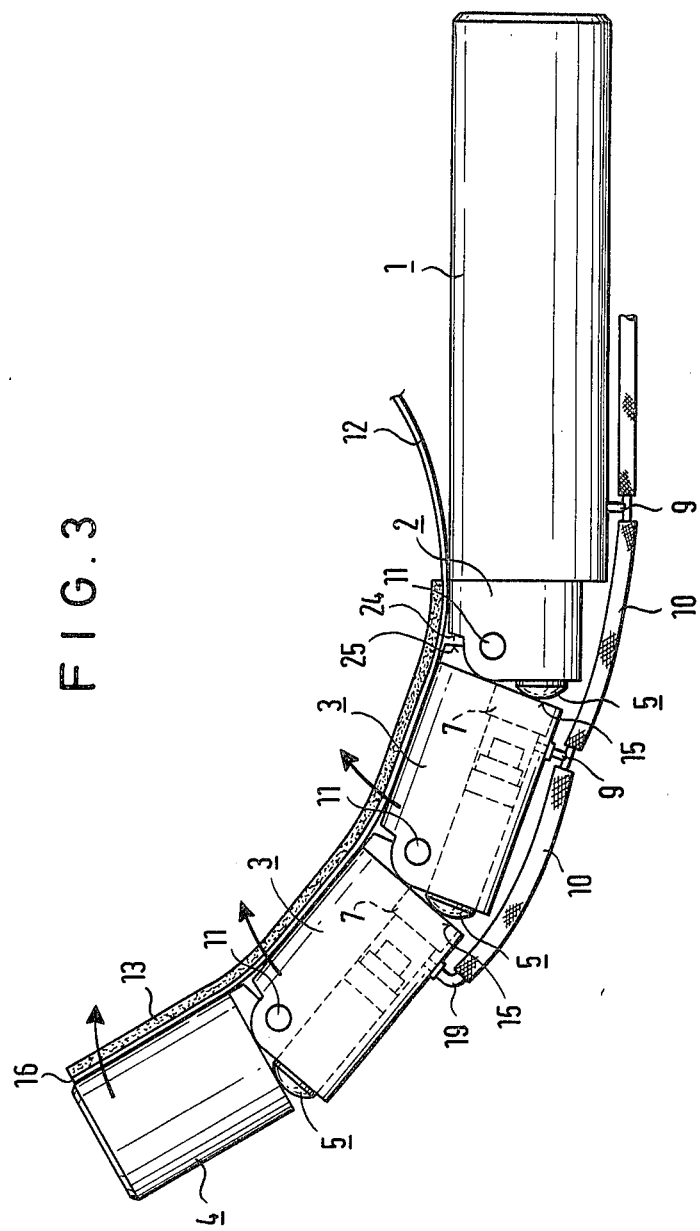
FIG. 3 shows the gripper according to FIG. 1 in its operating position.

All finger members with the exception of the end member 4 have, in the embodiment according to FIG. 1, an eccentric cylindrical bore hole 14 in which an axially movable piston 5 is housed. The piston 5 has a snap ring groove in its rear end area in which a sealing collar 6 made of plastic is inserted and tapers down in its rear area so as to produce an annulus in cylinder 14 for the pressure medium. Piston 5 is dimensioned so that between its rear end and an insert 7 an air space of approximately 1/10 mm remains. The face of piston 5 is rounded. The rounded part pushes against the face 15 of the finger member lying in front of this member as soon as the cylinder space 14 is pressurized. This takes place by way of the air pressure line 9 and the feeder line 10 which can be attached to this line. They fill and evacuate the cylinder spaces 14. The feeder lines 9 are T-shaped and the foremost feeder line 19 is L-shaped. The individual feeder lines 10 comprise elastic pressure tubes of proper length to allow the individual finger members to move from the position in FIG. 1 into the position shown in FIG. 3.

The front end of each piston 5 works together with the rear face 15 of the finger member lying in front, in each case, to pivot around the bearing bolt 11 when pressure is applied. The result of this finger member pivoting is a gliding movement between the two contact surfaces. To keep the wear occurring under these conditions to a minimum the finger members 3 are provided with a brass insert 7 in the area of their rear face 15 which serves as a gliding piece. The frontmost end member 4 does not have this insert. It is understood, however, that a brass gliding piece 7 can also be used here. The brass insert has two functions. In addition to reducing the friction caused when the individual finger members pivot, the gliding piece also works as a buffer on its face or a damping member when the gripper is returned after being evacuated, i.e. when the individual finger members are returned by the operation of the return spring 8 to the position shown in FIG. 1.

To improve the holding force of the gripper it can be given a coating 13 as shown in FIG. 1 which increases the friction and cannot be rubbed off in the gripping area or also in the area of its individual members. A pneumatic sensor line 12 of known construction is provided under this protective layer and is open at its front end 16. When this line is temporarily interrupted by contact between one or more finger members and the piece being grasped, a slight pressure blockage is caused which travels along line 12 back into a membrane amplifier valve, not shown in the drawing, in which the pressure impulse is transformed into an electrical control impulse initiating the desired movement after the gripping finger makes contact.

The pneumatic sensor line can also be modified relative to the embodiment shown in FIG. 1 so that the open end 16 on the gripping surface 13 opens, preferably in the central area of the gripping surface 13 of the individual finger members. Depending on the part being grasped the sensor line connection can be connected very simply to the side of the finger member in question which has a connection line inside which leads to the opening in the gripping surface 13.

Figure 1A:
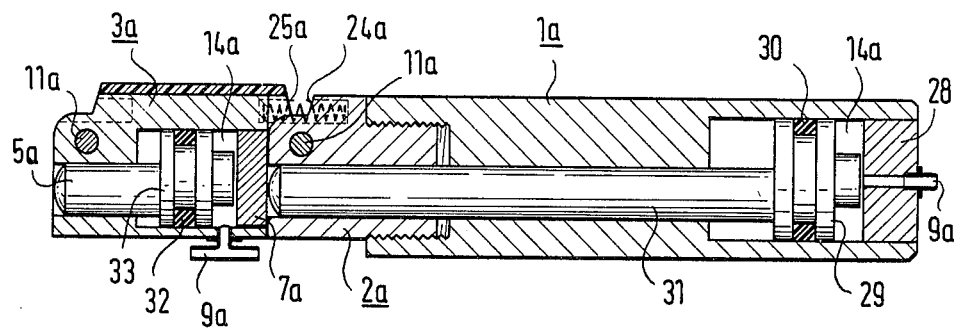
FIG. 1a is a side view of a gripper modified relative to FIG. 1 showing the shaft with its base member screwed in place and an additional finger member.

In the embodiment of the gripper according to the invention shown in FIG. 1a, the shaft 1a as well as the base member 2a, respectively the second and the subsequent finger members 3a, are somewhat differently formed in order to produce a greater holding force with a given operating pressure. To this end the shaft 1a has a central blind bore hole 14a with a relatively large diameter closed on the rear face through which the air pressure supply line 9a passes. A piston 29 and a sealing collar 30 fit in the cylindrical bore hole 14a on whose front face a push rod 31 rests. The push rod 31 in turn fits into the associated eccentric bore hole in the base member 2a and works with its front end against the rear face of insert 7a when the finger member 3a is pivoted around pin 11a.

The same construction is found again in the finger member 3a of the gripping finger: a piston 32, 33 corresponding to the piston 29, 30 in shaft 1a fits in the asymmetrical blind bore hole 14a which is closed at its open end by means of the insert 7a. The piston 32, 33 extends over the asymmetric seat 5a through the associated bore hole in the front end of the finger member 3a in order to work together with the corresponding rear face of insert 7a of the second finger member 3a lying in front of it and not shown in FIG. 1a. Corresponding pistons in the base member 1a, 29, 30, 31 and in the finger element 3a, 32, 33, 5a are preferably formed as a single unit. Due to the relatively large working surface of piston 29, 30 as compared with 32, 33 and the eccentric arrangement of the push rod 31 or 5a, the available operating pressure is utilized to an amplified extent. Between the rear seat of piston 29,30 and 32, 33 and the adjacent inner face of insert 28 or 7a, respectively, there remains an air space of one or a few tenths of a millimeter. When the gripping finger is pressurized the individual finger members can be pivoted far enough for the angled surface 24a on the base finger member 2a to make contact with the angled surface 25a on the first finger member 3a. The embodiment shown in the drawing produces an angle position of approximately 45° between the first finger member 3a and the shaft 1a. With an arrangement of two finger elements 3a this angle amounts to 90°, with three members 135°, and so on.

Figure 1B:
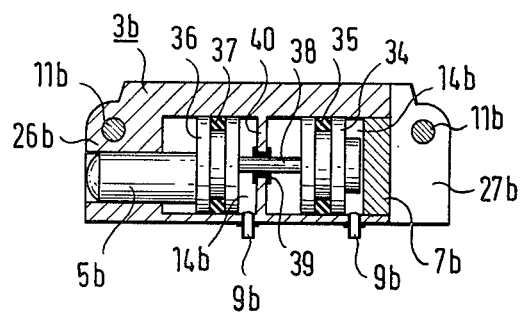
FIG. 1b shows an embodiment of an individual finger member which is modified relative to that in FIGS. 1 and 1a to have a double piston.

FIG. 1b shows a further variant of the gripper according to the invention illustrated by a single finger element 3b. The finger element 3b, similar to finger element 3a, exhibits a central blind bore hole 14b whose rear end is closed with the brass insert 7b. Deviating from the construction shown in FIG. 1a the piston here, however, is formed as a double piston 34,36. Both pistons have a sealing collar 35 or 37 and are connected to one another by means of a connecting rod 38 which extends through a bore hole in a dividing wall 40 and is provided with a seal 39. The two partial chambers 14b, 14b created by the dividing wall 40, are connected by pressure lines 9b to the air pressure line 10, not shown in FIG. 1b.

It is understood that the individual finger members 3b can be connected by means of their front and back protrusions 26b, 27b and the hinge pin 11b and can be hinged together to form member links of the gripper. The hindmost finger member 3b can also be activated by a double piston arranged on the gripper shaft, not shown. Its foremost push rod can pass through a bore hole in the base member element 2a similar to the push rod 31 in the embodiment according to FIG. 1a.

When the gripping finger according to the invention is brought into position individually or in multiples at the place where it is to be used the lead 10 is connected to the air pressure source and is pressurized at the moment the gripping effect is desired. This compressed air flows through the distributor parts 9 into the individual chambers 14 and pushes the piston 5 against the face surfaces 15 of the brass insert 7 lying in front of the piston heads, or in the case of the end member against the rear frontal surface of the end member 4. The pivoting movement of the individual finger members 3 and 4 around the bearing bolt 11 takes place in the extreme case until the angled surfaces 24, 25 of the adjacent finger elements come in contact with one another or until one or more finger elements come in contact with the object 41 to be grasped. At this moment there arises a slight pressure blockage in the sensor lead 12 which relays the contact with the production piece being grasped to a membrane amplifier valve from which an electrical signal for initiating the desired movement process is relayed e.g. lifting, lowering, moving laterally or the like the object that has been grasped. After bringing the object into the desired position the compressed air flow is interrupted, i.e. the chambers 14, 14a, 14b are vented to atmosphere. Then the compression springs 8 come into play to move the gripping fingers back to their normal position according to FIG. 1. The return force of springs 8 can be increased by arranging them in pairs; however they can also be strengthened by connecting the line 10 to a fluid source with reduced pressure to return it to its original position, e.g. an 80% vacuum. With such a method it is possible to use relatively weak springs 8 or to leave them out all together.

With this method the sliding pieces 7 have the additional function of damping the piston 5 when it returns under vacuum. The rear, somewhat tapered ends of piston 5 or 5a, 5b, respectively, abut the inside surface of the inserts 7 or 7a, 7b respectively.

Figure 4:
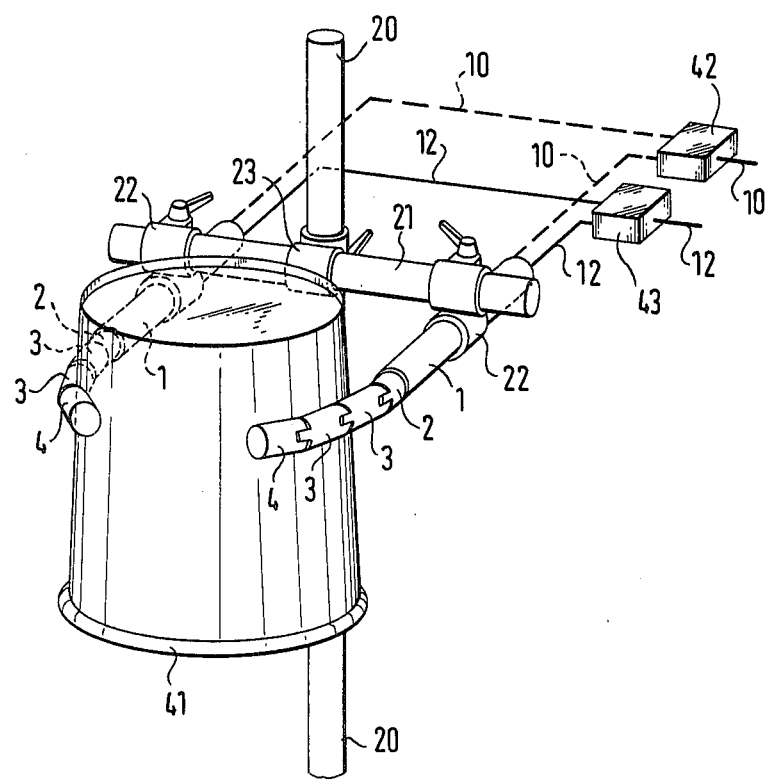
FIG. 4 shows an arrangement of two grippers disposed opposite one another and a support with an object grasped by the grippers.

FIG. 4 shows that it is possible and simple to assemble several grippers into a single operating unit. The gripper unit shown in FIG. 4 consists of two grippers according to the invention held by clamp elements 22, 23 which hold the gripper shafts 1. The clamp elements in turn rest on a tube section 21, which in turn is clamped to the stand rod 20. The result is a tong-like gripping element which is capable in this simplest of constructions of gripping the production piece 41. Each gripper consists of a shaft 1, a base member 2, two intermediate members 3 and an end member 4 and are connected by way of air pressure lines 10 in the distributor box 42 to a common air line 10. Of course additional grippers can be easily supplied with compressed air. Similarly the sensor lines 12 run into a common distributor box 43 and from there by way of a common sensor line 12 to the membrane amplifier valve not shown in the drawing.

Of course many types of gripper assemblies using commercially available tube systems, such as those used in laboratories to construct the larger support assemblies, can be created to carry out various tasks; for example several grippers can be clamped next to each other in a series onto a tube element, and individual grippers can also be set to close at a given angle relative to each other so that the desired manipulation can be carried out. The diameter of the shaft 1 is adapted to the customary bore hole sizes of known quick clamping elements.

What is claimed is:

1. Gripper for use in a manipulator which removes, transports and unloads production pieces, particularly pieces made of plastic in an injection molding machine, comprising a base member and a plurality of finger members which can pivot in sequence and toward each other and which are uniformly shaped, each finger member having a hydraulic cylinder for motive force, and which can be pneumatically swung into an operating position where they make contact with the objects to be gripped, each individual finger member (3) having a cylindrical shape, each having an axially parallel eccentric bore hole (14) which accommodates a piston (5) for imparting pivoting movement to the finger member; a head of the piston acting upon a rear surface (15) of a finger member immediately in front when pressure is applied causing the latter to pivot around a bolt (11) located beside the piston in a frontal area of each finger member.

2. Gripper according to claim 1, wherein each finger member (3) has a central tongue protrusion (26) on one side and two outer fork-like protrusions (27) on the other side, having bore holes (17, 18) to each accommodate a bolt (11).

3. Gripper according to claim 1 or 2, wherein the bore holes (14) in the finger members (2,3) which accommodate the piston (5) are closed off on the back ends facing a base shaft (1) with sealing inserts (7).

4. Gripper according to claim 3, wherein the inserts (7) are composed of a material with good sliding friction characteristics such as brass.

5. Gripper according to claim 4, wherein the bore holes (14) that accommodate the pistons (5) extend along the entire length of the finger members (2,3) and are expanded at the back to accommodate the inserts (7).

6. Gripper according to claim 3 wherein the bore holes (14a, 14b) that accommodate the piston (5a, 5b)

extend along the entire length of the finger members (3a, 3b) and have a central blind hole bore (14a, 14b) that accommodates the associated piston parts with a larger cross-section, into which the associated piston parts (32, 33 and 34, 35-36, 37 respectively) are fitted, and the blind holes (14a, 14b) are closed off on their open end by the inserts (7a, 7b).

7. Gripper according to claims 1 or 2, wherein the pistons (5) are each rounded in their frontal surface area and have an annular groove in their rear area which accommodates a piston ring (6).

8. Gripper according to claims 1 or 2, including a base shaft (1) with a round cross-section and a blind hole with internal threads in one surface into which a base finger member (2) screws, two finger members (3), and an end cap (4), wherein the finger members can pivot toward each other until pivot limiting stops (24, 25) engage allowing the finger members to form an angle of 45°.

9. Gripper according to claims 1 or 2, wherein compression springs (8) are provided between the individual finger members (2, 3, 4) which return the gripper to a rest position, and lines (10) which provide the bore holes (14) with pressure connected to an air pressure source with reduced pressure to increase the return force.

10. Gripper according to claim 9, wherein the compression springs (8) extend into blind bore holes in the surfaces of adjacent finger members which line up in the rest position of the gripper.

11. Gripper according to claims 1 or 2, wherein the finger members and the base shaft are constructed of a hardened aluminum alloy and have a round cross-section.

12. Gripper according to claims 1 or 2, wherein working surfaces of the finger members are coated with a high friction material, such as rubber.

13. Gripper according to claim 12 wherein a sensor line in the form of a thin tube (12) whose front end (16) is open is provided in the area of the working surface of the finger members (2,3,4) below said coating.

14. Gripper according to claim 12, wherein each finger member (2,3,4) has its own sensor line (12); the open front end (16) of this sensor line opens in the area of the working surface of the finger member, also covered with a coating; and the sensor line (12) can be connected on the side of any finger member depending on the task to be carried out.

* * * * *